US007275206B1

(12) United States Patent
Bates et al.

(10) Patent No.: US 7,275,206 B1
(45) Date of Patent: Sep. 25, 2007

(54) METHOD AND COMPUTER PROGRAM PRODUCT FOR IDENTIFYING HYPERTEXT LINKS IN DOCUMENT PRINTOUTS

(75) Inventors: Cary Lee Bates, Rochester, MN (US); Paul Reuben Day, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 493 days.

(21) Appl. No.: 09/292,444

(22) Filed: Apr. 15, 1999

(51) Int. Cl.
*G06F 17/00* (2006.01)
(52) U.S. Cl. .................... 715/501.1; 715/506
(58) Field of Classification Search ........... 707/501.1, 707/506
See application file for complete search history.

(56) References Cited

U.S. PATENT DOCUMENTS

| | | | | |
|---|---|---|---|---|
| 5,694,594 A | * | 12/1997 | Chang | 707/10 |
| 5,724,595 A | * | 3/1998 | Gentner | 345/744 |
| 5,781,914 A | * | 7/1998 | Stork et al. | 707/501.1 |
| 5,809,317 A | * | 9/1998 | Kogan et al. | 707/100 |
| 5,987,482 A | * | 11/1999 | Bates et al. | 707/10 |
| 6,122,647 A | * | 9/2000 | Horowitz et al. | 707/3 |
| 6,178,431 B1 | * | 1/2001 | Douglas | 707/512 |
| 6,332,148 B1 | * | 12/2001 | Paine et al. | 707/512 |

OTHER PUBLICATIONS

Microsoft Word Tutorial, "Microsoft Word Basic Features". http://baycongroup.com/wlesson0.htm, Microsft Word 1997.*
Advanced Microsoft Word, "Footnotes and Endnotes". http://www.utexas.edu/cc/training/handouts/wordadv/, 1996.*

* cited by examiner

*Primary Examiner*—Doug Hutton
*Assistant Examiner*—R. Singh
(74) *Attorney, Agent, or Firm*—Joan Pennington

(57) ABSTRACT

A method, apparatus and computer program product are provided for identifying hypertext links in document printouts. A document to be printed is scanned for identifying local hypertext links within the document. A page location of each identified local hypertext links within the document is computed and stored. Printable objects are sequentially checked to identify each printable object within a hypertext anchor tag. Each identified printable object within a hypertext anchor tag is rendered with a predefined indication of the hypertext link. A local hypertext link is printed with a page number of the hypertext link within the document. An external hypertext link is printed with a uniform resource locator (URL) for the external hypertext link. Both the page number of the local hypertext link within the document and the uniform resource locator (URL) for the external hypertext link can be printed, for example, in superscript form and bolded or with other highlighting.

10 Claims, 5 Drawing Sheets

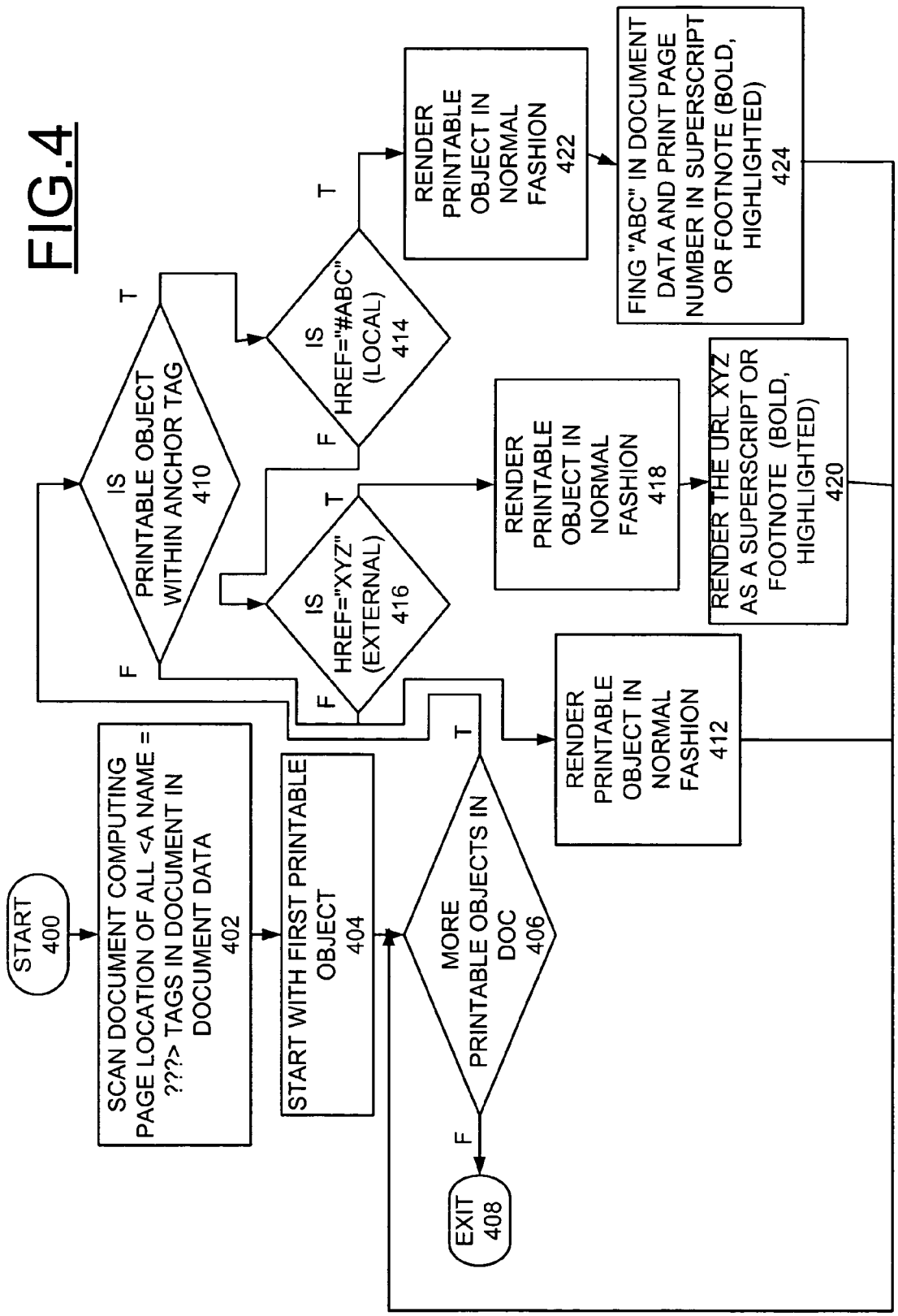

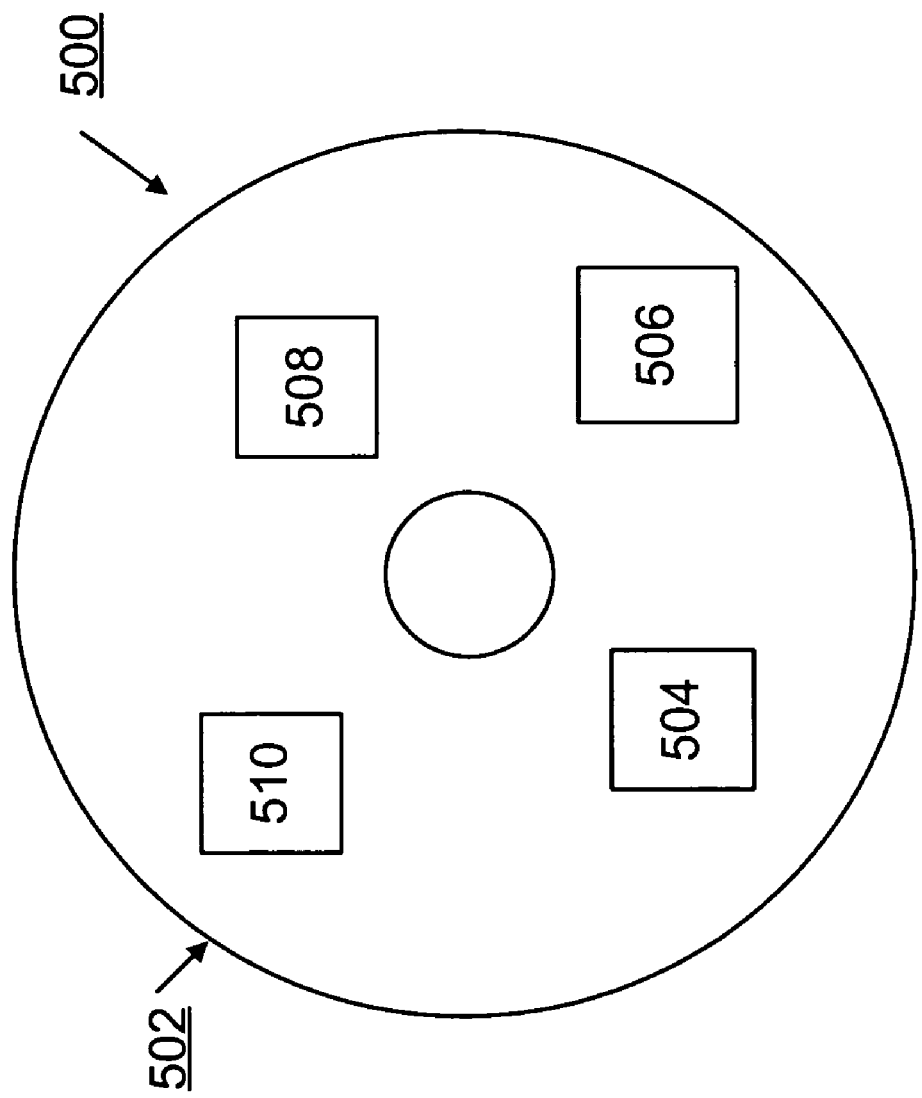

METHOD AND COMPUTER PROGRAM PRODUCT FOR IDENTIFYING HYPERTEXT LINKS IN DOCUMENT PRINTOUTS

FIELD OF THE INVENTION

The present invention relates generally to the data processing field, and more particularly, relates to a method, apparatus and computer program product for identifying hypertext links in document printouts.

DESCRIPTION OF THE RELATED ART

On a WEB document printout, generally no information about the hypertext links is available within the text of the printed document. Web documents are designed for browsing or reading on line. When reading a web based document on line, a user uses a mouse to click on the hypertext links or references to see the linked information. A mechanism is needed for identifying hypertext links in document printouts. As used in the following description and claims, a local or internal hypertext reference means hypertext pointing to a section of the current document that is within the same uniform resource locator (URL). As used in the following description and claims, an external hypertext reference means hypertext pointing to another uniform resource locator (URL).

SUMMARY OF THE INVENTION

A principal object of the present invention is to provide a method, apparatus, and computer program product for identifying hypertext links in document printouts. Other important objects of the present invention are to provide such method, apparatus and computer program product for identifying hypertext links in document printouts substantially without negative effect and that overcome many of the disadvantages of prior art arrangements.

In brief, a method, apparatus and computer program product are provided for identifying hypertext links in document printouts. A document to be printed is scanned for identifying local hypertext links within the document. A page location of each identified local hypertext link within the document is computed and stored. Printable objects are sequentially checked to identify each printable object within a hypertext anchor tag. Each identified printable object within a hypertext anchor tag is rendered with a predefined indication of the hypertext link.

In accordance with features of the invention, a local hypertext link is printed with a page number of the hypertext link within the document. An external hypertext link is printed with a uniform resource locator (URL) for the external hypertext link. The page number of the hypertext link within the document and the uniform resource locator (URL) for the external hypertext link can be printed, for example, in superscript form and bolded or with other highlighting.

BRIEF DESCRIPTION OF THE DRAWINGS

The present invention together with the above and other objects and advantages may best be understood from the following detailed description of the preferred embodiments of the invention illustrated in the drawings, wherein:

FIGS. 3 and 4 are flow charts illustrating exemplary steps for implementing document printing and identifying hypertext links in document printouts in accordance with the preferred embodiment; and FIG. 5 is a block diagram illustrating a computer program product in accordance with the preferred embodiment.

DETAILED DESCRIPTION OF THE PREFERRED EMBODIMENTS

Figure 1A:
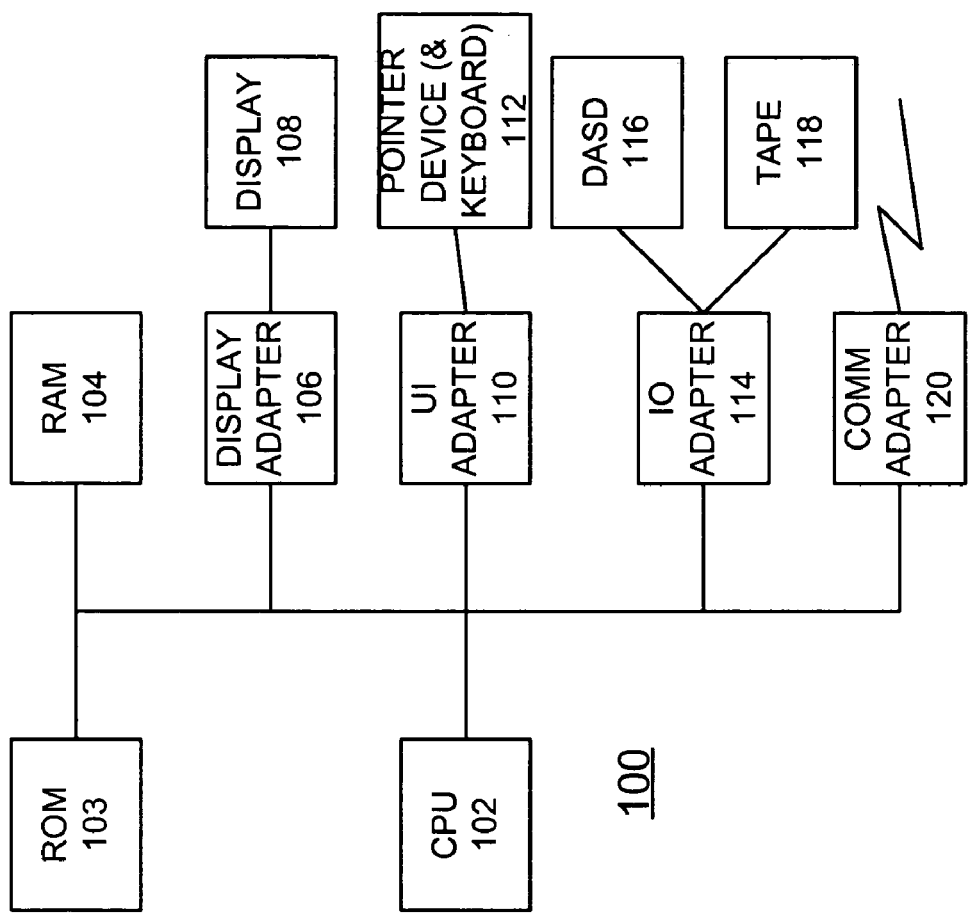
FIGS. 1A and 1B are block diagram representations illustrating a computer system and operating system for implementing a method and computer program product for identifying hypertext links in document printouts in accordance with the invention.
Figure 1B:
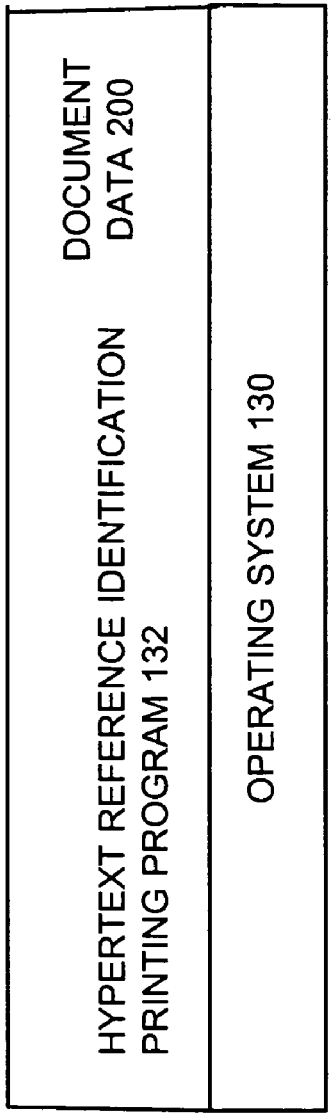

Having reference now to the drawings, in FIGS. 1A and 1B, there is shown a computer or data processing system generally designated by the reference character 100 for carrying out the document printing method for identification of hypertext references of the preferred embodiment. As shown in FIG. 1, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1.

As shown in FIG. 1B, computer system 100 includes an operating system 130 and a hypertext link identification printing program 132 of the preferred embodiment. In accordance with features of the invention, a document printout provides identification of local and external hypertext links or references. A table of document data 200 is stored for identifying local hypertext links in a document printout of the preferred embodiment.

Various commercially available computers can be used for computer system 100, for example, an IBM personal computer. CPU 102 is suitably programmed by the hypertext link identification printing program 132 to execute the flowcharts of FIGS. 3 and 4.

In accordance with features of the invention, hypertext links are easily identified when printing documents. For a local or internal hypertext reference with hypertext pointing to a section of the document that is within the same URL (an internal reference), the page number is calculated and inserted into the document printout. The internal hypertext reference text or hot text may be bolded or highlighted in various ways, and the page number is inserted in superscript or in parenthesis or the like. For example, an internal hypertext reference text may be printed as shown in the following Table 1:

TABLE 1

| Roof shingles should be attached with shingle nails$^{(page\ 15)}$ |
| --- | where "shingle nails" is the internal hypertext reference text to another portion of this document and the "page 15" is inserted at print time as a superscript, generated by the print function based on the current printer selected and the current font settings, margins, etc. that control the pagination for a given printout. It should be understood that the superscript may further describe where on page 15 where the referenced text appears, such as, to a paragraph number or to a line number.

In accordance with features of the invention, for an external hypertext reference with the hypertext pointing to a URL address external to the current document, the URL address is inserted into the printout, for example, in a superscript or other font at the point in the text where the hypertext appears or as a footnote with a footnote reference in the text. For example, an external hypertext reference text may be printed as shown in the following Table 2:

TABLE 2

You should frame art in quality picture frames[(http//www.Picture_Frames_Catalogue.com)]

where "picture frames" is hypertext to an external URL and the URL is printed as enclosed in parenthesis and in superscript. The reader is alerted that "picture frames" is hypertext to an external URL, and is also given the URL.

Instead of superscript, footnotes can be used to document a particular external URL. Footnotes containing the URL addresses can appear either at page bottom or grouped together on a separate page. With the URL addresses printed, the user can note the URL and then logon to the Internet to navigate to the given addresses if desired. For example, a group of external hypertext references may be printed in a footnote as shown in the following Table 3:

TABLE 3 picture frames[1]
art[2]
* * * footnotes:
[1](http://www.Picture_Frames_Catalogue.com)
[2](http://www.Art_Gallery_Catalogue.com)

Figure 2:
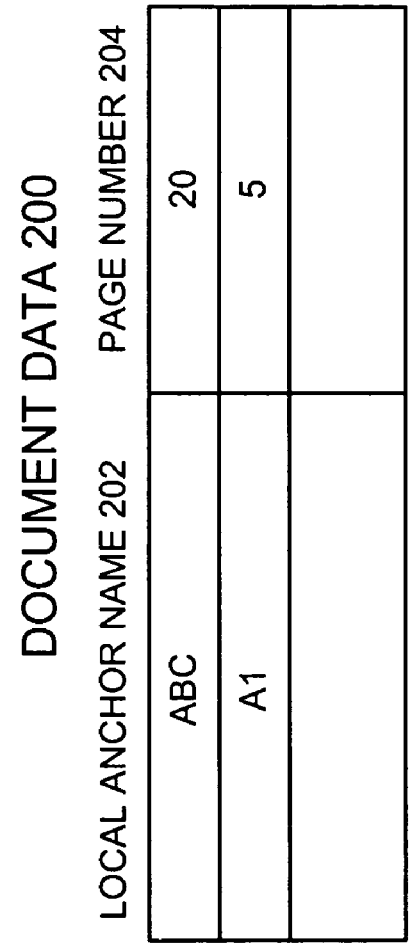
FIG. 2 is a chart illustrating a document data structure of the preferred embodiment.

Referring now to FIG. 2, document data 200 of the preferred embodiment is illustrated. The document data 200 is a table containing each local anchor name 202 from the <a name="???"> tag together with a page number 204 identified in a particular document to be printed. A print routine of the preferred embodiment, illustrated and described with respect to FIG. 4, first scans the particular document to be printed and determines the page on which all such anchor tags 202 appear. Then the local anchor names 202 and page number 204 are stored in document data 200. When printing the document, when a <a href="???"> is found, the page number for a local hypertext reference is retrieved from document data 200 and printed, for example, as shown in Table 1. When an external hypertext reference is found, such as <a href="???">PRINTABLE DATA</a>tag, the URL is printed, for example as a superscript after the printable data, such as shown in Table 2, where picture frames is the printable data and the URL is (http://www.Picture_Frames_Catalogue.com), or as shown in Table 3, where the URL is shown as a footnote.

Figure 3:
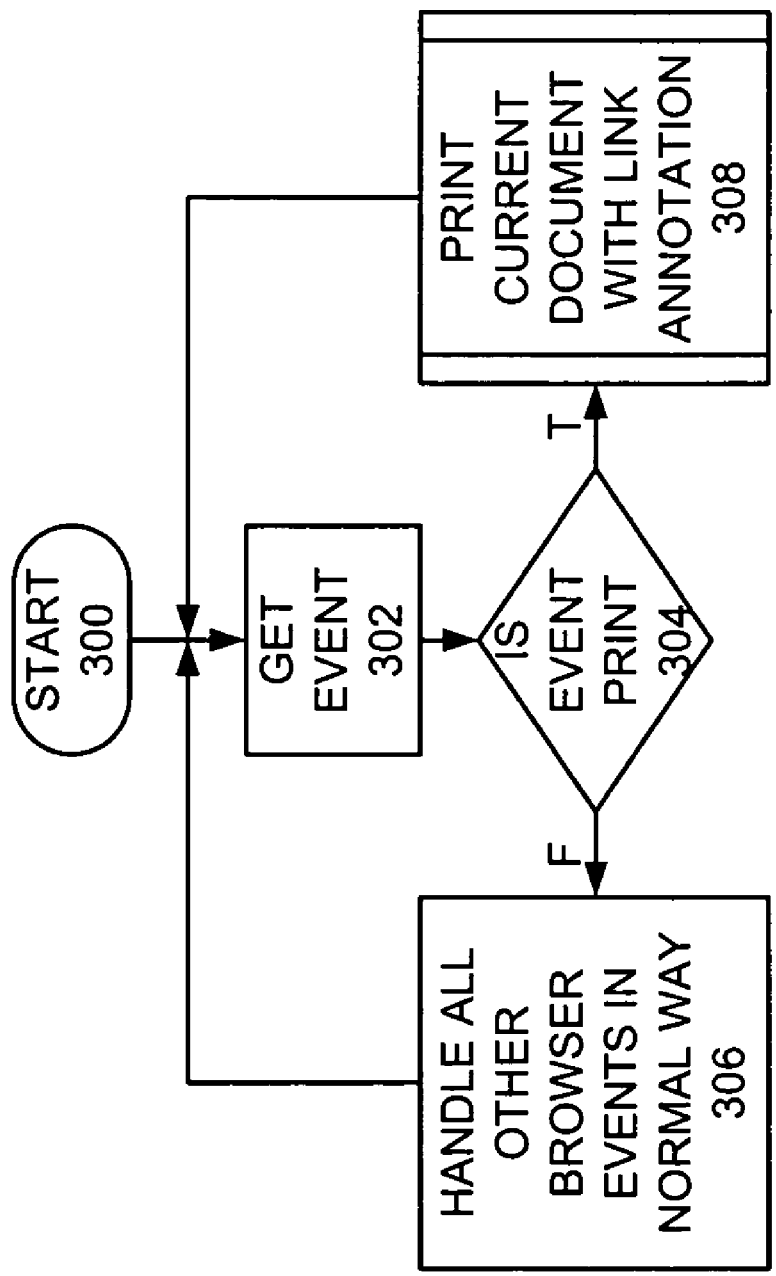

Referring now to FIGS. 3 and 4, exemplary steps are shown for implementing document printing including the identification of hypertext links in document printouts in accordance with the preferred embodiment. In FIG. 3, a main browser flow routine is shown starting at a block 300. An event is obtained as indicated in block 302. Checking whether the event is a print event is performed as indicated in a decision block 304. When a print event is identified, a routine is performed to print the current document with hypertext link annotation as indicated in block 308. The document printing routine of the preferred embodiment is shown in FIG. 4. Otherwise, when the event is not a print event, all other browser events are handled in the normal way.

Referring now to FIG. 4, exemplary steps of the print routine of the preferred embodiment are shown starting at a block 400. First as indicated in block 402, the document is scanned, computing a page location of all <a name="???">tags in the document and the computed page number 204 for each local hypertext link is stored with the name 202 in the document data. Then sequential operations start with a first printable object as indicated in block 404. A printable object is defined such that only one printable object can be included within an anchor tag. Checking for more printable objects is performed as indicated in a decision block 406. When another printable object is identified, checking whether the printable object is within an anchor tag is performed as indicated in a decision block 410. When the printable object is not within an anchor tag, then the printable object is rendered in the normal fashion as indicated in block 412. If true that the printable object is within an anchor tag, then checking for a local hypertext reference is performed as indicated in a decision block 414. When a local hypertext reference is not identified, then checking for an external hypertext reference is performed as indicated in a decision block 416. When an external hypertext reference is identified, then the printable object is rendered in normal fashion as indicated in block 418. Then the URL for the external hypertext reference is rendered, for example, in superscript or footnote form and may be printed bold or with other highlighting, as indicated in block 420. When a local hypertext reference is identified at block 414, then the printable object is rendered in normal fashion as indicated in block 422. Then the name for the local hypertext reference is found in the document data and a page number is printed, for example, in superscript or footnote form as indicated in block 424.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods for implementing document printing to identify hypertext links in document printouts of the preferred embodiment in the system 100 of FIGS. 1A and 1B.

A sequence of program instructions or a logical assembly of one or more interrelated modules defined by the recorded program means 504, 506, 508, 510, direct the computer system 100 for implementing document printing and identifying hypertext links in document printouts of the preferred embodiment.

While the present invention has been described with reference to the details of the embodiments of the invention shown in the drawing, these details are not intended to limit the scope of the invention as claimed in the appended claims.

What is claimed is:

1. A computer implemented method for identifying hypertext links in document printouts comprising the steps of:

scanning a document to be printed and identifying local hypertext links within the document, computing and storing a page location of each identified local hypertext link within the document, sequentially checking printable objects to identify each printable object within a hypertext anchor tag;

rendering each identified printable object within said hypertext anchor tag with a predefined indication of the hypertext link including printing a corresponding uniform resource locator (URL) for each external hypertext link and checking whether each said identified printable object within said hypertext anchor tag is a local hypertext link; and responsive to identifying said local hypertext link, printing said identified page number for said local hypertext link with said printable object.

2. The computer implemented method for identifying hypertext links in document printouts as recited in claim 1 wherein the step of printing said identified page number for said local hypertext link with said printable object includes the step of printing said identified page number in superscript form.

3. The computer implemented method for identifying hypertext links in document printouts as recited in claim 1 wherein the step of printing said identified page number for said local hypertext link with said printable object includes the step of printing said identified page number in bold form.

4. The computer implemented method for identifying hypertext links in document printouts as recited in claim 1 wherein the step of rendering each identified printable object within said hypertext anchor tag with said predefined indication of the hypertext link including printing said corresponding uniform resource locator (URL) for each said external hypertext link includes the steps of checking whether each said identified printable object within said hypertext anchor tag is an external hypertext link.

5. The computer implemented method for identifying hypertext links in document printouts as recited in claim 1 wherein the step of printing said uniform resource locator (URL) for said external hypertext link includes the step of printing said uniform resource locator (URL) in superscript form.

6. The computer implemented method for identifying hypertext links in document printouts as recited in claim 1 wherein the step of printing said uniform resource locator (URL) for said external hypertext link includes the step of printing said uniform resource locator (URL) in bold form.

7. A computer implemented method for identifying hypertext links in document printouts comprising the steps of:

scanning a document to be printed and identifying local hypertext links within the document, computing and storing a page location of each identified local hypertext link within the document, sequentially checking printable objects to identify each printable object within a hypertext anchor tag; and rendering each identified printable object within said hypertext anchor tag with a predefined indication of the hypertext link including printing a corresponding uniform resource locator (URL) for each external hypertext link and checking whether each said identified printable object within said hypertext anchor tag is an external hypertext link;

wherein the step of printing said uniform resource locator (URL) for external hypertext link is responsive to identifying said external hypertext link, and includes the steps of printing said uniform resource locator (URL) for said external hypertext link in a footnote for said printable object.

8. Apparatus for identifying hypertext links in document printouts comprising:

a stored document data, said document data including each local hypertext link name and a page number for each said local hypertext link name; and a printing program utilizing said stored document data for printing a document including a predefined indication of each hypertext link within the document to be printed including a corresponding uniform resource locator (URL) printed for each external hypertext link;

wherein said predefined indication of each hypertext link within the document to be printed includes a corresponding page number printed for each local hypertext link.

9. A computer program product for implementing document printing including identification of hypertext links comprising:

a recording medium;

means, recorded on the recording medium, for sequentially checking printable objects to identify each printable object within a hypertext anchor tag; and means, recorded on the recording medium, for rendering each identified printable object within said hypertext anchor tag with a predefined indication of the hypertext link including means, recorded on the recording medium, for printing a corresponding uniform resource locator (URL) for each external hypertext link;

means, recorded on the recording medium, for scanning a document to be printed and for identifying local hypertext links within the document, and means, recorded on the recording medium, for computing and storing a page location of each identified local hypertext link within the document.

10. A computer program product for implementing document printing including identification of hypertext links as recited in claim 9 wherein said means, recorded on the recording medium, for rendering each identified printable object within said hypertext anchor tag with a predefined indication of the hypertext link includes means, recorded on the recording medium, for printing said page number for each local hypertext link.

* * * * *